United States Patent [19]

Dimur et al.

[11] Patent Number: 4,647,766
[45] Date of Patent: Mar. 3, 1987

[54] OPTICAL MARK READER HEAD FOR DOCUMENT MARKINGS

[75] Inventors: Gérard Dimur, Epinay-sur-Orge; Frédéric Vainpress, Paris, both of France

[73] Assignee: SMH Alcatel, France

[21] Appl. No.: 726,738

[22] Filed: Apr. 24, 1985

[30] Foreign Application Priority Data

Apr. 26, 1984 [FR] France ............................... 84 06588

[51] Int. Cl.$^4$ .......................... H01J 5/16; H01J 5/02
[52] U.S. Cl. ................................ 250/227; 235/472; 250/239
[58] Field of Search .............. 235/472, 473; 250/227, 250/239, 566, 568, 569, 570

[56] References Cited

U.S. PATENT DOCUMENTS

| | | | |
|---|---|---|---|
| 3,503,666 | 3/1970 | Moore et al. | 350/96 |
| 3,868,514 | 2/1975 | Israelsson | 250/239 X |
| 4,288,701 | 9/1981 | Hill | 250/569 |

FOREIGN PATENT DOCUMENTS

| | | |
|---|---|---|
| 0071304 | 2/1983 | European Pat. Off. |
| 2127066 | 10/1972 | France |
| 2236397 | 1/1975 | France |
| 80/02615 | 11/1980 | PCT Int'l Appl. |

OTHER PUBLICATIONS

IBM Technical Disclosure Bulletin, vol. 16, No. 11, Apr. 1974, pp. 3726–3727, NY US, G. M. Heiling et al, "Document Detector and Reader".

IBM Technical Disclosure Bulletin, vol. 17, No. 6, Nov. 1974, pp. 1821–1822, NY US, P. F. Heidrich et al, "Optical Waveguide Links for High-Resolutions Scanner Applications".

Primary Examiner—Eugene R. LaRoche
Assistant Examiner—James C. Lee
Attorney, Agent, or Firm—Sughrue, Mion, Zinn, Macpeak, and Seas

[57] ABSTRACT

In an optical mark reader head comprising a light source (57) and two photosensors (58, 59) coupled to light transmission means forming a light emitting head (7) bracketed by two receiving heads (8, 9), all facing the document, and further comprising an analog processing circuit board (50) for the photosensor signals, supporting the light source and the photosensors. The invention provides transmission means in the form of rigid, preformed optical conduits (27, 28, 29) individually assembled and arranged relative to one another and together with the other reader head components in a single, flat case (1).

16 Claims, 16 Drawing Figures

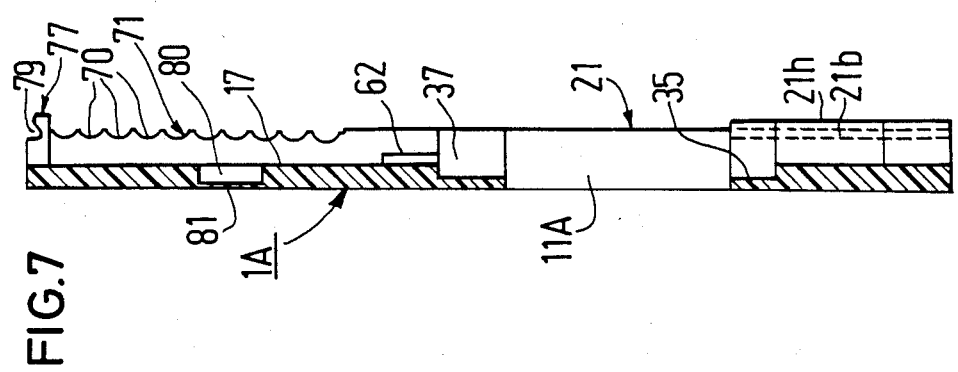
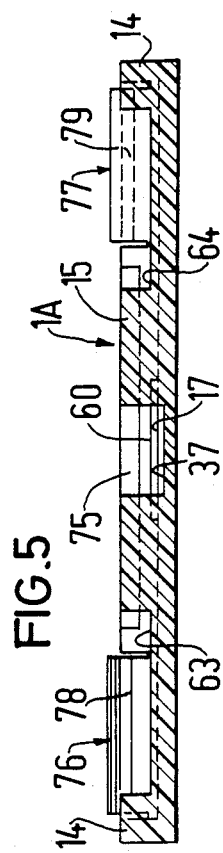
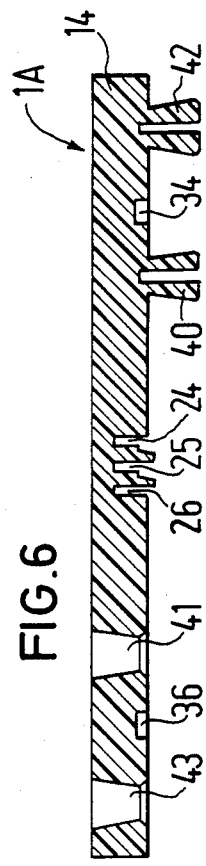
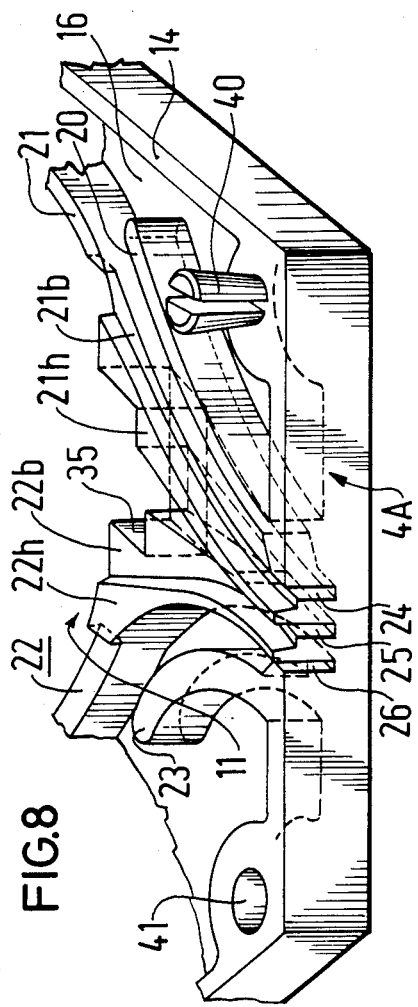

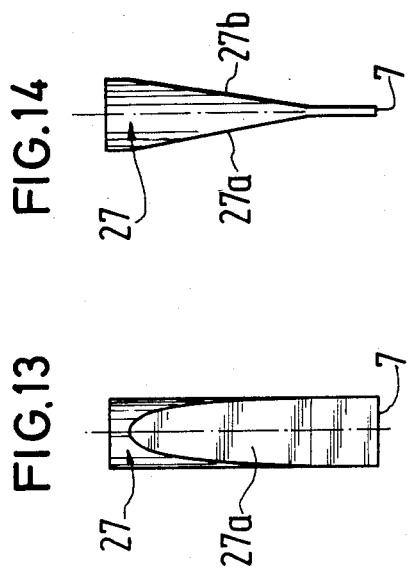
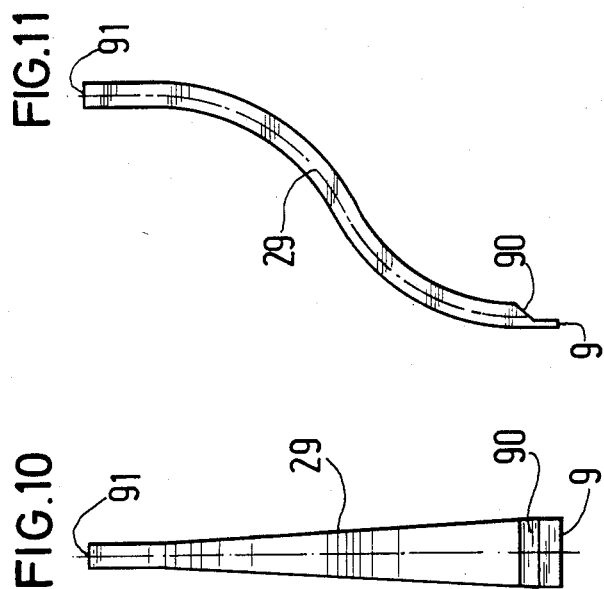

OPTICAL MARK READER HEAD FOR DOCUMENT MARKINGS

FIELD OF THE INVENTION

This invention concerns the reading of marks such as bar codes or characters carried by a document or a moving object with the greatest possible reliability of recognition to derive intelligence therefrom or to determine the print quality thereof. It specifically addresses one way of constructing such reader heads as are used in automatic mail handling and sorting systems.

BACKGROUND OF THE INVENTION

Mark scanning or optical mark reading devices are known which are based on the principle of optical detection of a mark on the surface of a document due to the fact that the light reflected from a mark is less than the light which would be reflected by the same surface without marks. The common approach is to set up a light source, such as an electric light bulb, for example, near the surface of the document, together with a light sensor, such as a photodiode.

The photodiode measures the light reflected by the mark and converts this quantity to an electrical current; this current must exceed a certain threshold to be taken into account and indicate the presence of a mark.

There are a number of disadvantages associated with the prior art devices however. The light source, placed near the document, radiates heat which could damage the document. With a moving document, on a conveyor for example, the document to source and/or sensor distance has been observed to vary, bringing about a variable electrical response from the sensor. This results in a fuzzy determination of the threshold, known as the mark detection threshold, at which the electrical signal delivered by the photodiode should be taken into account. Also, differences in the document's background color or shade as well as differences in print quality of the markings result in variable sensor response. Such variable mark reading conditions can lead to photodiode electrical response minima for which the marque detection threshold is not always attained. The operator is then required to manually adjust the threshold according to the reading conditions, by guessworking a potentiometer. In actual operation, the light source may also exhibit small changes in light intensity due to temperature or power supply instabilities.

All of these factors are a source of numerous errors in the interpretation of data read from the documents.

Some optical mark readers have been developed in the prior art to minimize the above-mentioned drawbacks, especially the need to adjust the mark detection threshold, making use of two photosensors coupled to a differential output amplifier and comprising means for further processing of the resulting differential signal. The optical mark reader described in French patent application No. 81 08886 by the same assignee is based on such a differential measurement principle for mark recognition.

Moreover, it removes the light source and preferably also the photosensors some distance away from the documents to reduce their incidences and thus equally minimize possible errors and preclude possible damage to the documents. To this end it uses three sets of optical fibers, with first ends of one of the sets of fibers coupled by means of optical connectors to the light source, the first ends of the other two sets of fibers coupled respectively to each of the two photosensors, the opposite ends of the three sets defining a light-emitting head and two flanking receiving heads facing the document. The receiving heads are mutually arranged so that they simultaneously receive light reflected by two parallel areas of the document, said areas being as close to one another as possible so as to be equivalent in terms of the document's background shading, yet distinct enough that one and only one of them carries the series of marks to be read whilst the other is blank. Said heads are assembled on a support purposely provided with three parallel positioning slits for their accommodation.

In the optical reader according to the above-mentioned patent application, the two photosensors or photodiodes, as well as separate amplifiers for the two photodiode signals and the optical connectors used to couple the optical fiber sets to the photodiodes are mounted on an analog input card. The electrical signals from the photodiodes are transmitted after amplification over electric cables to a digital processing system.

The present invention is directed to an optical reader head based, as in the previously mentioned patent application, on the principle of a differential input for mark reading, with the removal some distance away from the documents of both the light source and the photosensors. Its main object is to specify a rugged, yet compact, low-cost optical reader head obviating the problems associated with mass production of the previous head unit and with its fragility.

The invention thus provides an optical reader head for document markings comprising a light source and two photosensors, all three removed from the scanned document and coupled to light transmission means defining a set of three individual terminal heads arranged side by side and parallel to one another in front of said document, one of said terminal heads being light-emitting and being bracketed by said two other, light-receiving heads, and further comprising an analog circuit for processing the electrical signals transmitted by said photosensors, said reader head being characterized in that said source, said photosensors, said light transmission means and said analog processing circuit board are grouped together and positioned relative to one another in a same flat supporting case, said case being internally divided by a ridge going substantially through the center thereof, parallel to the two small opposite faces or front and back faces thereof, into a front section and a back section, said front section being provided with three rigid, preformed optical conduits forming said light transmission means spaced apart by sets of ribs in said case defining their respective channels to form three parallel slits in said front face, substantially crossing the center portion thereof, said two light-receiving side channels fanning away from one another as of substantially the front face, said back section carrying said analog signal processing circuit, on which are mounted, on the same side thereof, said two photosensors, arranged in cavities provided in said central dividing ridge, into which cavities issue said respective side channels, and said light source, said latter source being connected to said circuit at least through a cutout in said central ridge.

According to one embodiment of the invention, said rigid optical conduit or lightwave guide located in the center channel termed the emitting conduit is given a coupling end of circular cross section for coupling with said source and its other end, forming said light-emitting head, is given a rectangular cross section, the longer dimension thereof being substantially the same length as the cross-sectional diameter of said coupling end.

According to another embodiment of the invention, said rigid optical side or "outside" channels, termed the light-receiving conduits, are given a coupling end of either square or rectangular cross section for coupling with one of said photosensors and their other end, forming said receiving head, is given a rectangular cross section one of the sides whereof is smaller than its corresponding dimension on the photosensor coupling end.

Advantageously, the cross sections of the coupling end and of the end forming the receiving head of said light-receiving outside conduits are substantially equal. They are furthermore preformed in the shape of a slanted S. Said optical conduits are made of molded plastic, for example of polymethacrylate or polycarbonate (PC).

In still another embodiment of the invention, said light source is located in said front section of the supporting case and a window is provided in at least one of the broad sides of said case in front of said source.

The light source is preferably mounted in a heat sink extending throughout the height of said window transversely to said front face of the case and held in said cutout in the center ridge and in a recess provided in line therewith in the ribs bounding said center channel, said heat sink acting as an extension of said center channel.

In yet another embodiment of the invention, said analog processor board is locked in place within said back section of the case by a stop provided on the back wall thereof and by said photosensors pressing against said coupling ends of said light receiving conduits.

Said supporting case is preferably made of two identical mating halves.

Other features and advantages of the present invention will be more readily apparent in reading the following description of an embodiment with reference to the appended drawings.

BRIEF DESCRIPTION OF THE DRAWINGS

FIGS. 5, 6 and 7 are cut away views taken respectively along broken lines V—V, VI—VI and VII—VII of FIG. 3;

FIG. 8 is a perspective view of a portion of the front section of the case half shown in FIG. 3;

FIGS. 10, 11 and 12 show one of the side or receiving optical conduits of the reader head seen from the side, in elevation and in foreshortened view from below, respectively;

FIGS. 13, 14 and 15 show the light-emitting, center optical conduit according to the invention as seen from the side, in elevation and from the bottom or front of the head respectively;

DESCRIPTION OF THE PREFERRED EMBODIMENT

Figure 1:
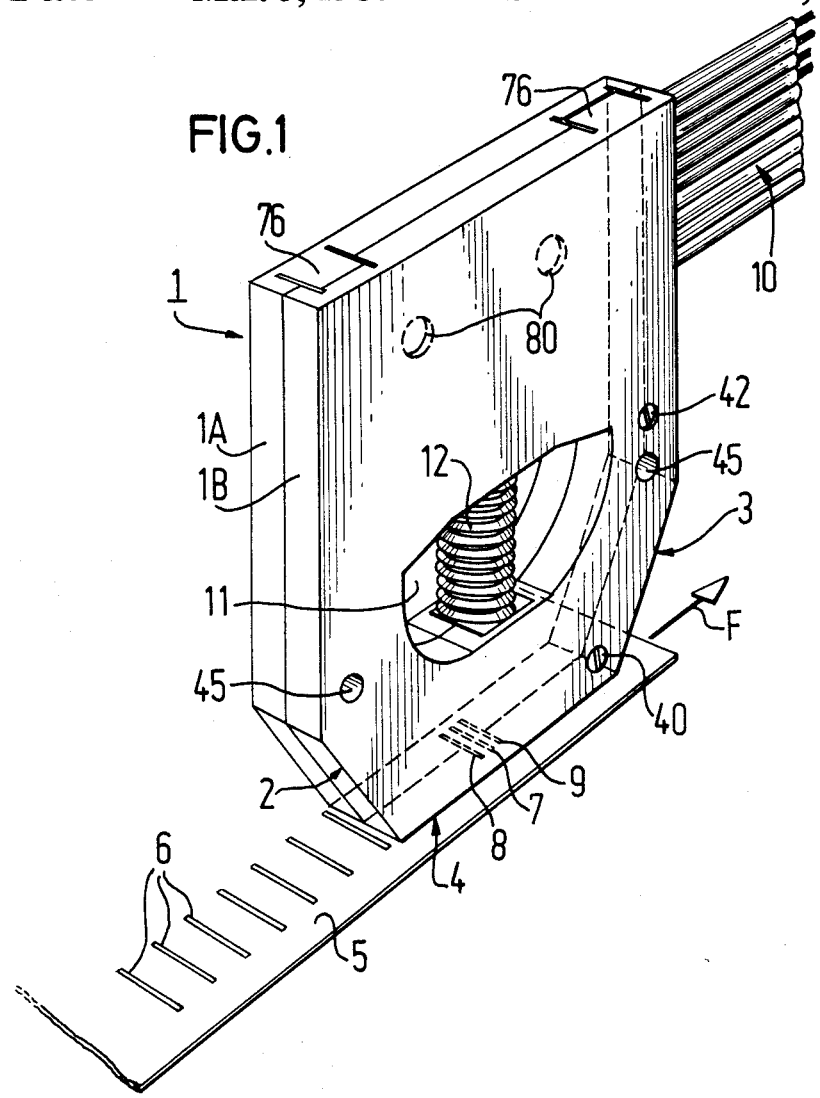
FIG. 1 is a perspective view of the mark reading head according to the invention.
Figure 2:
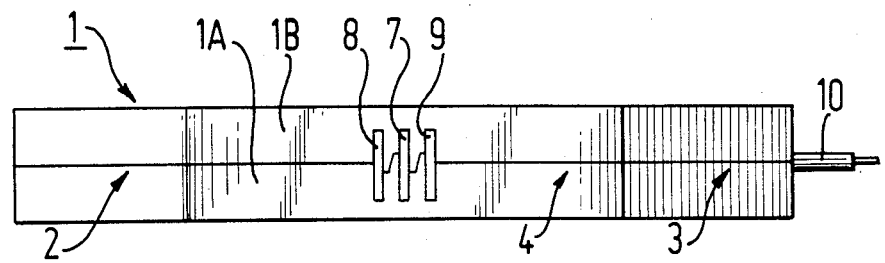
FIG. 2 is a plan view of the reading face or front face of said head.

Referring to FIGS. 1 and 2, the reader head 1 according to the invention can be seen to consist of a flat case designated at 1, made up of two identical mated halves 1A and 1B. The case is basically shaped as a rectangular prism with two adjacent corners cut by side bevels 2 and 3. The small side 4 of the prism bounded by these two bevels constitutes the reading face or front face of the reader head designed to read marks 6 on a document 5 running before it in the direction of arrow F. Said marks 6, which may be a row of bars as illustrated or characters in a computer printout, provide various intelligence concerning the document, for example document identification, collating information requiring bundling of varying numbers of pages with or without various additional items, data for personalized stamping of envelopes containing the documents and/or for segregating the envelopes containing said bundles such as for mail sorting or post code classification purposes. Documents may also be read merely for purposes of checking print quality.

The head 1 is provided on its front face 4, for mark reading purposes, with three distinct scanning heads arranged in parallel side by side relation. One of said scanning heads, being the center head 7, is light-emitting and the other two, being the side heads 8 and 9 located to either side of said center head 7, are receivers for the light reflected from the document. Said heads 7, 8 and 9 are arranged crosswise to the long axis of said front face 4, near its center; they are spaced relative to one another such that the emitting head 7 lights the two areas of the document in front of the two receiving heads and that when either of the receiving heads 8 or 9 is aligned with a mark, the other receiving head is aligned with a blank space and vice-versa.

As the illustration shows, the mark reader head is also equipped with a five-pair ribbon cable 10 connected to its side for outputting the sensor signals and for carrying power to the head circuitry.

It is also provided with a through-window 11 occupying about a quarter of its height and having a substantially semicircular shape, located in the front section of the head case but somewhat removed from front face 4. Said window 11 is crossed by a heat sink 12, mounted therewithin, transversely to front face 4.

The two mating halves 1A and 1B of the case are preferably made of molded plastic.

These mating halves, which are identical, will now be described with reference to FIGS. 3 through 8, depicting half 1A. The equipment of the case, shown in FIG. 9, will also be described.

Mating half 1A has an inside rim or edge rim 14 and is divided into two sections, namely a front section 16 including said front face and a back section 17 including the back face, by a ridge 15 running substantially through its center, parallel to said front face. The parts of this case already mentioned in the description of FIGS. 1 and 2 bear the same references, followed by the letter A, in subsequent figures.

Figure 9:
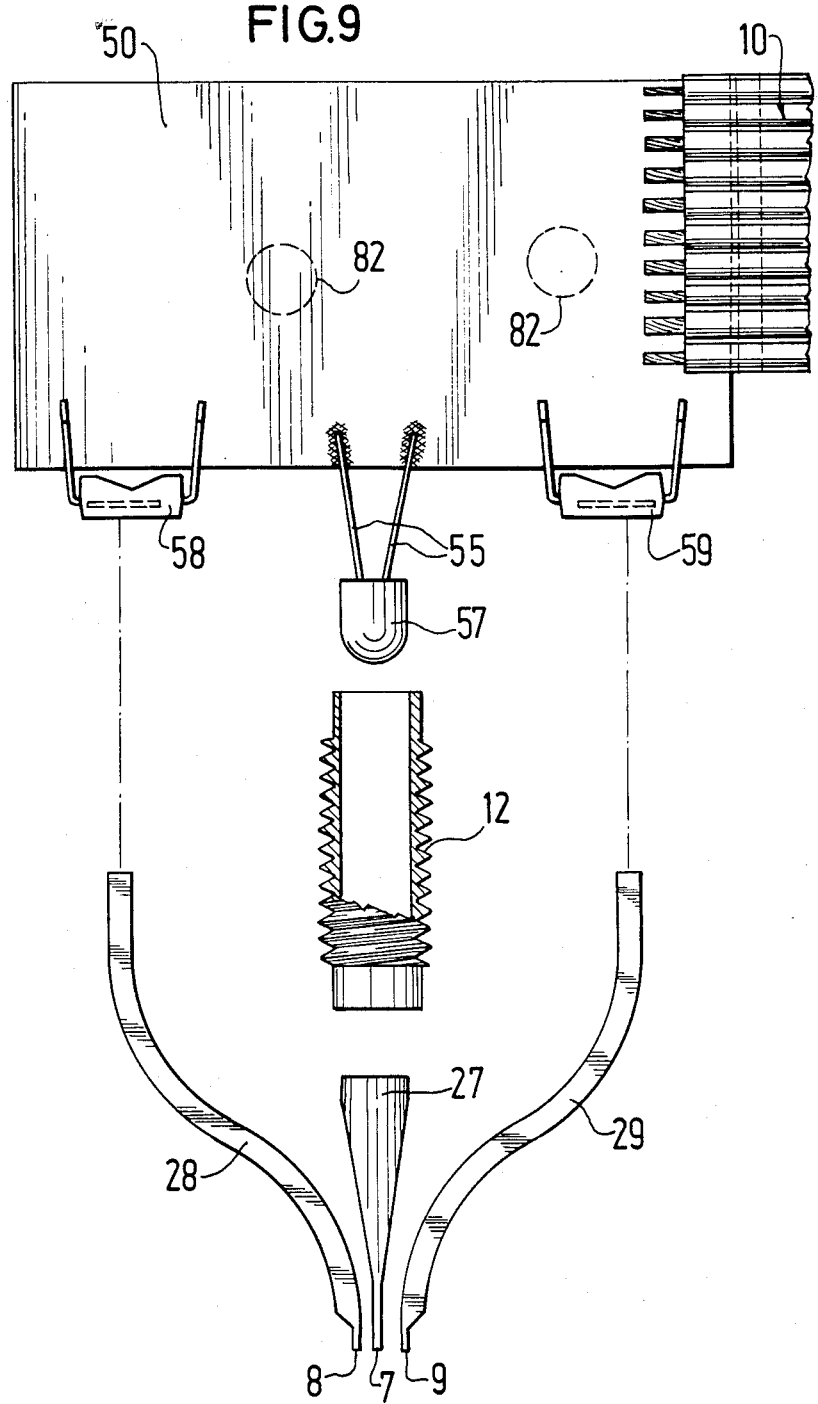
FIG. 9 is an exploded view in elevation showing the relation among the reader head components.

In the front section 16 of the case, a set of four ribs 20, 21, 22 and 23 at least partially bound therebetween three grooves or channels 24, 25 and 26 for three rigid, preformed optical conduits 27, 28 and 29, FIG. 9, including a center, light emitting conduit and two light receiving conduits, which are its basic components. These channels issue at the center of front face 4A, where they define, when joined with their corresponding channels in the other mating half of the case, three parallel slits crossing the longitudinal axis of the front face and serving to relatively position and hold in place the light-emitting center head 7 and the two light-receiving heads 8 and 9 forming the front ends of the optical conduits.

The edge rim 14 and center ridge 15 are substantially half as high as the equipment that will be carried by the assembled case and in particular, as one of the transverse dimensions of the conduits.

Two of the above-mentioned ribs, namely the two outside ribs 20 and 23 are curved to fan out from front face 4A. Both of said ribs are provided, on their vertical facing walls and near the front face 4A, with oblique shoulders 30 and 33 to reduce the width of the slit in the front face relative to that of the corresponding conduit channel.

Said two ribs 20 and 23 are interrupted halfway into case front section 16, substantially over the full height of window 11A. This non-continuity of the ribs 20 and 23 allows possible deformation of the optical conduits 28 and 29. The ends of each of the channels 24 and 26 opposite front face 4A are respectively defined by slots 34 and 36, bounded by the walls of ribs 21 and 22 respectively and the walls of two bulges in peripheral rim 14. Said ribs 20 and 23, incidently, are the same height as rim 14.

The two intermediate ribs 21 and 22 in set of ribs 20-23 extend all the way through front section 16, fanning out from front face 4A as do ribs 20 and 23 and partly skirting window 11A, along which they are at the same level as rim 14. Said ribs between themselves bound compartment or center channel 25 between window 11A and the front face for light-emitting center optical conduit 27. They are given a variable width in this area so that the width of channel 25 matches that of conduit 27, described below, and so as to limit the terminal slit of the channel which receives the terminal emitting head 7 of conduit 27. Moreover, these ribs, in the same window-to-front face area, are stepped relative to rim 14 such that one is slightly higher than rim 14 on the side of center channel 25 and lower than rim 14 on the side of side channel 24 and the other the reverse with respect to channels 25 and 26. For greater clarity, letters have been added to the rib reference numbers in FIGS. 3 and 4 to indicate where they are higher (h) or lower (b) than the reference level given by rim 14 and ribs 20 and 23. Said reference level is labelled r in FIG. 4 and can be seen to lie between levels h and b.

These level differences make it easier to correctly position the optical conduits in their channels in one of the half-cases and enable more accurate alignment of the two mating halfs during assembly and better holding of their internal components.

The same ribs 21 and 22 are further provided with notches 31 and 32 respectively in their facing walls near window 11A so as to establish a recess 35 to accommodate one end of heat sink 12 and position and hold said heat sink between the two assembled half-cases. A matching cutout 37 is provided opposite this recess, in the center ridge 15, to similarly receive the other end of heat sink 12 which thus extends through the height of window 11A. Said radiator-type heat sink 12 is internally fitted with an electric lamp 57, FIG. 4, as well as with the terminal portion of optical conduit 27 at the opposite end of said conduit from light-emitting head 7, thus coupling them.

Figure 3:
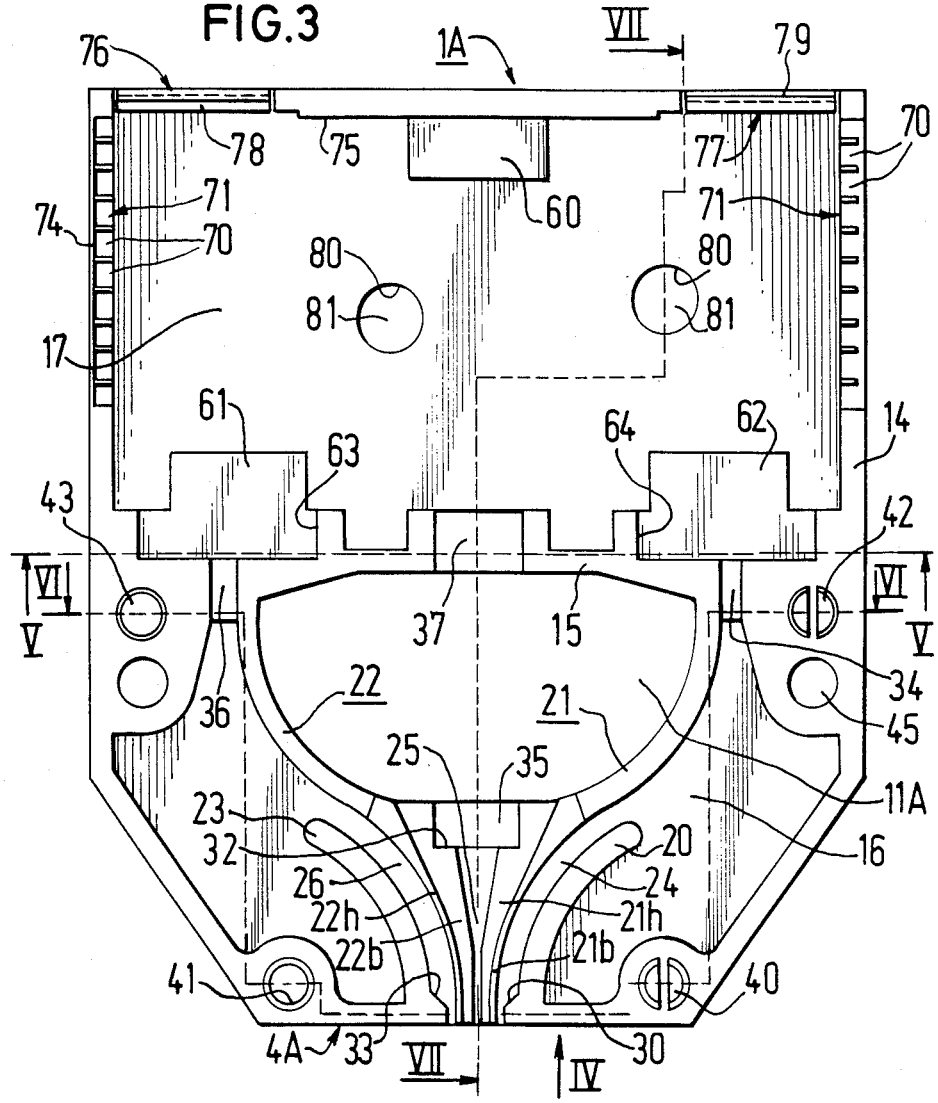
FIG. 3 is an elevation of one of the two mating halves of the case.
Figure 4:
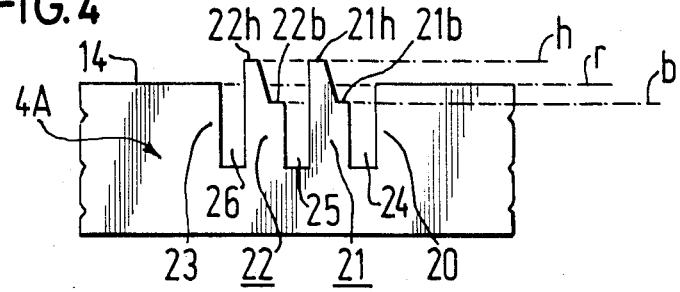
FIG. 4 is an enlarged, view of a portion of the front face, taken in the direction of arrow IV of FIG. 3.

Looking at the same front section of the case in FIG. 3, the figure shows a split pin 40 and a mating hole 41, located at the two respective reinforced front corners of rim 14, and another identical split pin 42 and cylindrical mating hole 43 located in similar lateral bulges of rim 14, near center ridge 15, serving to assemble the two mating halves. Two more holes such as 45 are provided to enable several reader heads to be ganged for reading several rows of marks.

Looking now at the bank section 17 of the head case, the corresponding part of rim 14, together with center ridge 15, forms a compartment for an analog processing circuit board 50, FIG. 9 which will support a hybrid circuit connected to the previously-mentioned ribbon cable 10.

Accordingly, the bottom of the back section of half-case 1A is provided with three slightly raised bearing surfaces 60, 61 and 62 for the circuit board. Said surfaces are arranged in a triangular pattern, one being placed substantially against the center of the rear wall of the half-case defined by rim 14 and the other two being placed against the center ridge 15 near the respective parts of rim 14 defining the side walls of the half-case. There are also two wide notches 63 and 64 provided in center ridge 15 and opening onto section 17, within which two of the supporting surfaces 61, 62 were formed. The two slots 34 and 36 receiving the terminal portions of optical conduits 24 and 26 at the opposite ends from the receiving heads, issue into notches 64 and 63 respectively. Said notches 63 and 64 accommodate two photosensors 58 and 59 mounted on the edge of circuit card 50 and are connected to the circuit thereon. The light source 57 is also connected to card 50 from which it takes its power supply and is mounted on the same side of the card as the photosensors; its rigid connections such as 55 on the circuit carried by the card help keep it away from the card and from the photosensors and help steer it substantially through the center of window 11A, into heat sink 12. Said hard-wired connections 55 go through center ridge 15 at the level of the cutout 37 mentioned above.

The rim 14 on each side of said back section 17 is partially notched over most of its thickness to define individual compartments such as 70 for the conductors of cable 10. Said notched portion 71 is slightly below the level of rim 14 and is externally bounded by a thin-wall portion of rim 14, said thin-wall portion on one side of the half-case being cut out or punched out to enable passage of the cable 10 whilst said thin-wall portion on the other side of the half-case is left standing to seal the case formed when the two half-cases are mated.

Rim 14 is given a reinforced center section at the back of the half-case, towards the inside of said back section 17, to form a back stop 75 for the corresponding edge of card 50. A pair of notches is provided in rim 14 on each side of said back stop, defining two locking tongues 76 and 77 for assembling the two mating halves. Each of said tongues is slightly raised relative to the surrounding portions of rim 14. Said raised part forms a terminal fixing lug 78 and 79 resulting from the thinning of rim 14 thereunder, one of said lugs 78 facing towards the inside of section 17 and the other 79 towards the outside.

Two circular recesses 80 are further provided in the bottom of the back section 17 of half-case 1A, leaving a thin bottom wall 81 therein which can easily be knocked out. Said recesses 80 are arranged to match up with potentiometers belonging to the processing circuit on card 50, enabling adjustment of signal levels from the photosensors, which potentiometers are represented by broken lines in FIG. 9, labelled 82.

FIG. 1 shows these knockouts 81 removed, leaving circular holes 80, for easy access to said potentiometers. Also apparent on this figure are the back locking tongues 76 belonging to half-cases 1A and 1B, and the ends of split pins 42 and 40 on half-case 1A engaged through their mating holes in half-case 1B (such as holes 43 and 41 of 1A) to fasten together the two halves. Also shown are the holes such as 45 through the reader head 1 enabling attachment of several ganged heads.

The optical conduits in the front section of the head are described with reference to FIGS. 10 through 12 as concerns the light-receiving conduits such as conduit 29 and with reference to FIGS. 13 through 15 as concerns the light-emitting center conduit 27.

The two receiving optical conduits are identical. The figures illustrating receiver conduit 29 show this to be basically ogee shaped, or in the form of a slanted S, said S being flipped over in FIG. 11.

Said conduit 29 has a constant thickness for most of its length, except for its end portion defining receiving head 9, which is reduced in thickness by a factor of approximately three by a bevelled or oblique side wall 90. The cross-sectional area of receiving head 9 is made substantially equal to that of the conduit's opposite, photosensor coupling end 91 by giving said conduit a variable height between its ends (FIG. 10). To enable good alignment of said coupling end 91 with the sensing portion of the photosensor, said end 91 is given a rectangular, and preferably a square cross section.

The emitting optical conduit 27, as shown in FIGS. 13 through 15, is basically a rod, shorter than the receiving conduits; its end forming the emitter head 7 is given a rectangular cross section and its light source coupling end, a circular cross section. The intermediate portion between these two ends is smoothly tapered due to its two opposite side walls 27a, 27b being symmetrically inclined towards its longitudinal center plane to channel the light rays collected at its coupling end toward the emitter head 7.

These light-emitting 27 and light-receiving conduits, such as 29, are made of molded plastic and preferably, as previously stated, of polymethacrylate or polycarbonate. As an indication of their size, the receiving conduits have a receiving head measuring 3×0.35 mm in cross section and a coupling end measuring 1.1×1.1 mm in cross section, for example, whilst the emitting conduit has an emitting head measuring 3×0.35 mm in cross section and a coupling end of 3 mm diameter.

Figure 16:
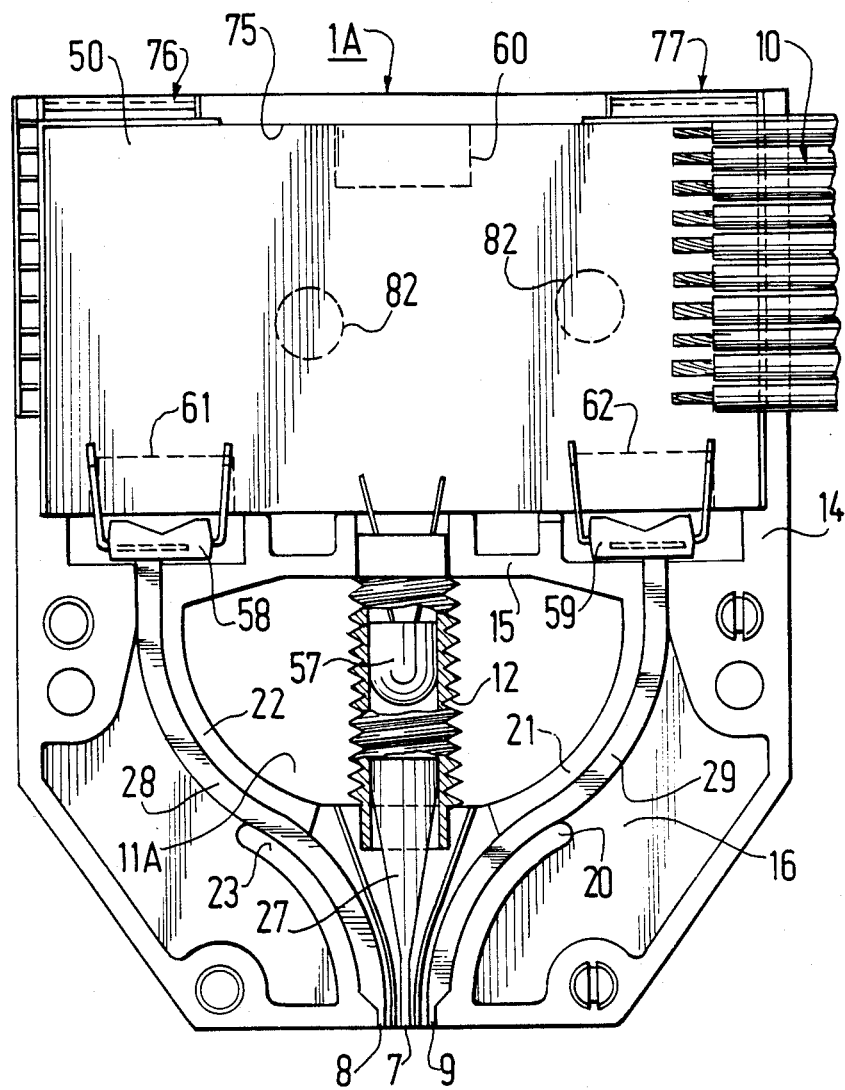
FIG. 16 is an elevation of one of the mating halves of the head case equipped with the components of the reader head.

FIG. 16 shows how the head components are mounted on half-case 1A. Specifically, light source 57 is mounted in heat sink 12, substantially at the center of window 11A and the heat sink serves as a support for both the light source and the emitting optical conduit 27 the coupling end whereof is slightly removed from the lamp. The circuit board or card 50 can be seen mounted in its compartment, held in place by one of its edges pressing against back stop 75 and the faces of photosensors 58 and 59, mounted on the opposite end of the board, pressing against the coupling ends of receiving conduits 28 and 29.

The resulting pressure on optical conduits 28 and 29 can be compensated by their being allowed to bend into the area lacking the outside ribs 20 and 23 determining their channels toward the front of the case.

FIG. 16 also shows up the advantages of the reader head according to the invention. Besides the differential measurement approach to mark sensing and, if need be, mark recognition, and the removal of the light source away from the document, the mounting of the light in a heat sink substantially in the center of a window allowing a free flow of air therearound reduces the effects of heat from the source to a minimum. Moreover, the source's positioning away from the processing card and the photosensors, and its isolation from the latter due to the center ridge and the enclosing heat sink, and from the optical conduits by the ribs, prevents unwanted light from impinging upon the optical conduits or the photosensors.

These advantages are also derived from the ogee shape of the receiving optical conduits 28 and 29 which enables their spacing from the source and determines the location of the photosensors on the edge of card 50. The choice of such stiff but elastically deformable conduits ensures that they will be kept firmly in place in the head whilst at the same time helping to secure the circuit card 50.

The dimensions of said conduits, especially of their light inlet cross sections relative to their light outlet cross sections, ensure, in the case of the light emitting conduit, a maximum recovery of light from the source and precise centering of said light in relation to the two very closely spaced scanning areas, and in the case of each of the light receiving conduits, accurate recovery of the light reflected by the area of document directly in front of it, and a wide distribution of this light reflected directly onto the sensing surface of the associated photosensor in direct contact therewith.

The relative arrangement of the head components, their mounting and assembly, and the choices made with respect to the optical conduits used indeed provide an easy-to-fabricate, tight, compact and very rugged optical reader head.

The invention has been described with reference to one example of construction illustrated in the drawings. It should be understood that modifications to details of the invention and/or replacement of some of the means by equivalent means may readily occur to those skilled in the art without departing from the scope and spirit of the invention as defined by the following claims.

What is claimed is:

1. In an optical mark reader head for scanning documents comprising; a light source, two photosensors, all three removed from the scanned document and being coupled to light transmission means defining a set of three individual terminal heads arranged side by side and parallel to one another in front of said document, one of said terminal heads being light-emitting and being bracketed by said other two terminal heads, light-receiving heads, said optical mark reader head further comprising an analog circuit for processing the electrical signals transmitted by said photosensors, the improvement wherein said source, said photosensors, said light transmission means and said analog processing system are grouped together, a flat supporting case carries and positions said source, said photosensors, said light transmission means, and said analog processing system relative to one another, said case being formed of two abutting case halves and said case having opposed front and back faces and being internally dived by a lateral ridge going substantially through the center thereof, parallel to said front and back faces thereof and dividing said case into a front section and a back section, said front section being provided with three rigid, preformed optical conduits forming said light transmission means spaced apart by set of ribs in said case halves defining respective channels therefor to form three parallel slits in said front face, substantially crossing the center portion thereof, said two light-receiving side channels fanning away from one another from the front face, said back section carrying said analog processing circuit, on which are mounted, on the same said thereof, said photosensors, arranged in cavities provided in said central dividing ridge, into which cavities issue said respective side channels, and said light source, and said light source being connected to said circuit at least through a cutout in said central ridge.

2. Optical reader head according to claim 1, wherein said rigid optical conduit located in a central channel termed the emitting conduit is given a coupling end of circular cross section for coupling with said source and another end of rectangular cross section, forming said light-emitting head, the longer rectangular dimension thereof being substantially the same length as the cross-sectional diameter of said coupling end.

3. Optical mark reader head according to claim 2, wherein said emitting conduit includes a smoothly tapering mid-section bounded by two facing walls symmetrically inclined towards its longitudinal center plane.

4. Optical reader head according to claims 1 or 3, wherein said rigid optical conduits located in said side channels, termed light receiving conduits, are given a coupling end of rectangular cross section for coupling with one of said photosensors and another end of rectangular cross section forming said receiving head, one of the rectangular dimensions thereof being smaller than its corresponding dimension on the photosensor coupling end.

5. Optical reader head according to claim 4, wherein the cross sections of said coupling end and of said receiving head end of said light receiving conduits are substantially equal.

6. Optical reader head according to claim 5, wherein said light receiving conduits have a substantially constant thickness throughout their length, except at the end forming the receiving head and bounded by an oblique side wall, and a smoothly increasing height from the coupling end thereof to the receiving head end thereof.

7. Optical reader head according to claim 4, wherein the coupling end of each of said light-receiving conduits is in direct contact with the sensing surface of its associated photosensor.

8. Optical reader head according to claim 1, wherein said light receiving conduits are preformed in the shape of a slanted S.

9. Optical reader head according to claim 2, wherein said optical conduits are made of molded plastic.

10. Optical reader head according to claim 1, wherein said light source is located in said front section of the supporting case and a window is provided in front of said light source in at least one of the broad sides of said case.

11. Optical reader head according to claim 10, wherein a heat sink extends throughout the height of said window transversely to said front face of the case and held in said cutout in said center ridge and in a recess provided in line therewith in said ribs bounding said center channel, said heat sink acting as an extension of said center channel and said light source is mounted in said heat sink.

12. Optical reader head according to claims 10 or 11, wherein said two ribs bounding said center channel between them are stepped the same way in the area between said window and said front face of said case, such that one of them is higher on the side bounding the center channel and lower on the side bounding the side channel, in relation to the height of the outside ribs, and the other the reverse.

13. Optical reader head according to claim 12, wherein said window is at least partly bounded by said center channel bounding ribs.

14. Optical reader according to claim 1, wherein some of said ribs terminate in proximity to the window.

15. Optical reader head according to claim 1, wherein said analog processing circuit is locked in place within said back section of the case by a stop provided on a back wall of said case and by said photosensors pressing against said coupling ends of said light receiving conduits.

16. Optical reader head according to claim 1, wherein said supporting case consists of two identical half-cases assembled by their outside edges.

* * * * *